US011442421B2

(12) United States Patent
Dressler et al.

(10) Patent No.: US 11,442,421 B2
(45) Date of Patent: Sep. 13, 2022

(54) ADAPTER FOR CONNECTING AN EMBEDDED SYSTEM TO A CONTROL COMPUTER, AND METHOD FOR ADAPTING AN ADAPTER

(71) Applicant: dSPACE digital signal processing and control engineering GmbH, Paderborn (DE)

(72) Inventors: Marc Dressler, Paderborn (DE); Thomas Sander, Frankfurt (DE); Guenter Menke, Paderborn (DE)

(73) Assignee: dSPACE GmbH, Paderborn (DE)

( * ) Notice: Subject to any disclaimer, the term of this patent is extended or adjusted under 35 U.S.C. 154(b) by 409 days.

(21) Appl. No.: 16/665,478

(22) Filed: Oct. 28, 2019

(65) Prior Publication Data
US 2020/0064803 A1 Feb. 27, 2020

Related U.S. Application Data

(63) Continuation of application No. PCT/EP2018/059902, filed on Apr. 18, 2018.

(30) Foreign Application Priority Data

Apr. 28, 2017 (EP) .................................... 17168710

(51) Int. Cl.
*G05B 19/042* (2006.01)
*G06F 11/07* (2006.01)
*G06F 11/36* (2006.01)

(52) U.S. Cl.
CPC ...... *G05B 19/0425* (2013.01); *G06F 11/0736* (2013.01); *G06F 11/3656* (2013.01);
(Continued)

(58) Field of Classification Search
CPC ...... G05B 19/0425; G05B 2219/21109; G05B 2219/34219; G06F 11/0736; G06F 11/3656; G06F 9/541
See application file for complete search history.

(56) References Cited

U.S. PATENT DOCUMENTS 5,898,595 A  4/1999 Bair et al.
8,230,083 B2  7/2012 Higuma et al.
(Continued)

FOREIGN PATENT DOCUMENTS

DE  102004027033 A1  10/2005
EP      1548983 A1   6/2005
(Continued)

OTHER PUBLICATIONS

German Office Action dated Oct. 22, 2021 in corresponding application 18717935.3.
(Continued)

*Primary Examiner* — Kidest Bahta
(74) *Attorney, Agent, or Firm* — Muncy, Geissler, Olds & Lowe, P.C.

(57) ABSTRACT

An adapter for connecting an embedded system to a control computer having a standard interface, in particular a network interface, a first subcircuit, and a second subcircuit, the first subcircuit being designed to communicate with the control computer via the standard interface by means of a standard protocol, preferably XCP. The first subcircuit is designed to convert a protocol functionality requested in the standard protocol via the standard interface, out of a set of supported protocol functionalities into the call for one or more elementary functions out of a defined overall set of elementary functions. The first subcircuit is connected to the second subcircuit via an internal interface, wherein the second subcircuit has a programmable computing module which is configured to provide at least one elementary function out of (Continued)

the overall set of elementary functions which can be called up via the internal interface by means of a call.

19 Claims, 4 Drawing Sheets

(52) U.S. Cl.
    CPC ............. *G05B 2219/21109* (2013.01); *G05B 2219/34219* (2013.01)

(56) References Cited

U.S. PATENT DOCUMENTS

| | | | |
|---|---|---|---|
| 8,645,918 B2 | 2/2014 | Leinfellner et al. | |
| 8,751,707 B2 | 6/2014 | Moench et al. | |
| 2006/0168236 A1* | 7/2006 | Higuma | ................ H04L 12/282 |
| | | | 709/227 |
| 2007/0236346 A1* | 10/2007 | Helal | .................. H04L 12/2803 |
| | | | 340/539.22 |
| 2012/0290749 A1* | 11/2012 | Moench | .................. G06F 9/541 |
| | | | 710/63 |
| 2013/0117769 A1 | 5/2013 | Sharma et al. | |

FOREIGN PATENT DOCUMENTS

| | | |
|---|---|---|
| JP | H11505943 A | 5/1999 |
| JP | 2002007164 A | 1/2002 |
| JP | 2009245242 A | 10/2009 |
| JP | 2012208843 A | 10/2012 |
| WO | WO2011088878 A1 | 7/2011 |

OTHER PUBLICATIONS

International Search Report dated Jul. 13, 2018 in corresponding application PCT/EP2018/059902.
Translation of extended European Search Report dated Oct. 24, 2017 in corresponding application 17168710.6.

* cited by examiner

ADAPTER FOR CONNECTING AN EMBEDDED SYSTEM TO A CONTROL COMPUTER, AND METHOD FOR ADAPTING AN ADAPTER

This nonprovisional application is a continuation of International Application No. PCT/EP2018/059902, which was filed on Apr. 18, 2018, and which claims priority to European Patent Application No. 17168710.6, which was filed on Apr. 28, 2017, and which are both herein incorporated by reference.

BACKGROUND OF THE INVENTION

Field of the Invention

The present invention relates to adapters for connecting an embedded system to a control computer and to a method for adapting such adapters.

Description of the Background Art

Embedded systems, therefore, compact and energy-saving computers, which interact with the environment according to the particular application via an adapted, often minimal, interface, are customary in many technical fields. In particular, these can control devices that measure parameters of a physical process with the help of one or more sensors and influence this physical process by means of one or more actuators.

When a new product is to be developed, a strategy known as Rapid Control Prototyping (RCP) is often used, in which an existing control unit is used in the respective physical process, therefore, for example, controls an engine of a motor vehicle, and only individual functions or control strategies are changed. In this procedure, which is also known as bypassing, provided that sufficient resources are available on the control unit, the new control strategy can be calculated directly in the control unit (internal bypassing) or the calculation can be carried out in an external control computer, which often has a several times the computing power but also several times the energy requirement of a conventional control unit (external bypassing).

In both cases, an interface is required via which values are read from the control unit and/or transferred to it. Adapted adapters are available for certain common processor families. For example, DE 102004027033 B4, which corresponds to U.S. Pat. No. 8,645,918, and which is incorporated herein by reference, discloses an influencing device which is connected via a control unit/debug interface to a control unit and via a data transmission interface to an operating unit such as a standard PC.

If older control units and/or control units with a less common microcontroller are used, a dedicated development of the interface is required for each individual case. For this purpose, a large number of control unit details must be determined or communicated to the developer of the adapter. Even if this information were readily available, the development involves a considerable amount of time and money.

A connecting module for connecting at least one device to a service-oriented architecture (SOA) network is known from WO 2011/088878 A1, which corresponds to U.S. Pat. No. 8,751,707, wherein a functionality of the at least one device is mapped as a service in the SOA network, the connecting module has at least one first interface for connecting the at least one device and at least one second interface for connecting the SOA network, and the connecting module has a computing device for executing a computer program. One part of the computer program to be executed is specified by default and another part of the computer program is freely programmable by a manufacturer of the at least one device in order to adapt firmware, which is present on the at least one device, to the SOA network. SOA extends the concept of web services into an architecture for comprehensive and service-based applications that provide technical and business services in the form of loosely coupled services. Based on a definition of the system to be incorporated, a framework is generated that the manufacturer of the device fills with appropriate functions in source code. The connecting module thus enables an encapsulation of functions of a device without know-how about web services. Service descriptions are stored in a repository so that, for example, a sensor can be accessed via a radio transmission link.

For control units, especially in motor vehicles, hard real-time requirements usually apply in which the reaction to a new sensor value must take place within a predetermined maximum latency of, for example, one millisecond. For bypassing, this results in the requirement that the data exchange must take place in a fraction of this time. The Association for Standardization of Automation and Measuring Systems (ASAM) has defined a universal measurement and calibration protocol XCP for bypassing. For example, the version ASAM MCD-1 XCP V1.3.0 was released on May 1, 2015 (cf. www.asam.net). Additional functions of new versions are optional, so that subsequent versions remain compatible. The universal measurement and calibration protocol can use various network interfaces, such as, e.g., Ethernet. Nevertheless, an individual implementation of XCP for use with an older control unit is complex and not cost-effective.

SUMMARY OF THE INVENTION

It is therefore an object of the present invention to provide individual adapters. In particular, the user is to be given the opportunity to independently undertake an extensive adaptation of the available functionalities.

An adapter according to an exemplary embodiment of the invention for connecting an embedded system to a control computer comprises a standard interface, in particular a network interface, a first subcircuit, and a second subcircuit. The first subcircuit is designed to communicate with the control computer via the standard interface, in particular according to a standard such as Ethernet or IOCNET, by means of a standard protocol, preferably XCP. The first subcircuit is connected to the second subcircuit via an internal interface, wherein the second subcircuit has a programmable computing module which is configured to provide at least one elementary function out of the overall set of elementary functions which can be called up via the internal interface by means of a call. The first subcircuit is designed to convert one or more values received via the internal interface into a protocol format of the standard protocol, wherein the second subcircuit can be connected to the embedded system via an individual interface. According to the invention, the first subcircuit comprises a programmable logic device and a non-volatile memory in which a fixed configuration of the programmable logic device is stored, wherein the first subcircuit is designed to convert a protocol functionality requested in the standard protocol via the standard interface, out of a set of supported protocol functionalities into the call for one or more elementary functions out of a defined overall set of elementary functions, and wherein the second subcircuit comprises a user-writable memory in which the binary code of the programmable computing module can be stored. In particular, the implementation of at least one elementary function can be adapted by the user.

Because the adapter of the invention is divided into two subcircuits, the first subcircuit can be permanently implemented or configured independently of the embedded system to be connected, and does not need to be adapted. Preferably, the first subcircuit comprises a complete implementation of a standard protocol such as XCP. Preferably, the component population of the first subcircuit remains fixed, and the second subcircuit has electrical connections that enable an adaptation of the components disposed on the second subcircuit.

The second subcircuit can be created by the user using a predetermined specification, which defines properties of the programmable computing module and/or the further equipping or interconnection of the second subcircuit. In particular, a circuit specification, which can preferably be passed on in a textual or binary form and adapted, can be defined for the second subcircuit.

The fact that the first subcircuit is permanently implemented is intended to mean in particular that a binary code of the first subcircuit is stored in a non-volatile memory and remains unchanged, regardless of the configuration of the second subcircuit. Converting here means transforming a protocol functionality into one or more elementary functions, wherein preferably at least one elementary function is called up when two or more protocol functionalities are transformed, so that the total number of elementary functions can be kept low. The various elementary functions or the total number of elementary functions are expediently predefined.

The second subcircuit can be designed adaptable and can in contrast comprise both different circuit components as well as binary code adapted to the specific application case. Here, one or more elementary functions out of a total number of elementary functions can be individually implemented in the binary code. It is advantageous if the second subcircuit comprises a user-writable memory in which the binary code for configuring the programmable computing module can be stored. If the second subcircuit contains a programmable computing module of a predetermined type, the second subcircuit can be configured using a predefined file such that all calls for a defined functionality provide a defined zero value or error value. A user can adapt the second subcircuit to provide one or more defined elementary functions, these being preferably created by means of libraries. Thus, it is only necessary to define a desired functionality, but not to develop the full implementation of a standard protocol. Preferably, the total number of elementary functions provides a subset of the protocol functionalities defined in the XCP standard. If only individual elementary functions are implemented individually in the specific application case (therefore, the number of functions is again reduced compared with the scope of protocol functionalities supported in principle), the effort for the user can be kept particularly low.

The embedded system can be, for example, a control unit for which the term electronic control unit (ECU) is also commonly used. In particular, it can be a motor vehicle control unit. Control units are often adapted to the specific task, wherein a microcontroller used is selected based on the lowest possible cost and required computing power. If a new control unit is developed based on an existing design, it can also be provided to continue to use older microcontrollers with individual interfaces.

The control computer can be a conventional user PC, realized either as a laptop or as a desktop, but it can also be an application-specific computer, which is designed, for example, with regard to the permissible temperature range for use in a motor vehicle. In particular, the control computer can also be a special RCP system. The standard interface, via which the control computer is connected to the first subcircuit, can be designed in accordance with a wired or wireless Ethernet standard; expediently, this can also be a manufacturer-specific standard, in particular IOCNET from dSPACE, which is optimized, for example, with regard to the real-time capability of the system.

The programmable computing module can be designed as a programmable logic device (FPGA) and/or as a microprocessor. The programmable computing module is preferably configured with the help of a non-volatile memory in which a configuration and/or program instructions for executing the at least one functionality are stored. If the second subcircuit comprises a programmable logic device, it can be configured, for example, using a VHDL file containing an interface definition. In this case, it is advantageous if a return of a zero value or error value is predefined for functions which are not further implemented. This makes it easier to use a fixed first subcircuit; an unwanted call for an unimplemented protocol functionality can easily be determined on the basis of the zero value or error value on the part of the control computer.

The individual interface can comprise a level adjustment and an individual connector; depending on the microcontroller used in the embedded system, it can be based on a standard such as JTAG or Nexus and in particular comprise proprietary extensions of the standard.

The internal interface can in principle be tunneled via any physical interface. Thus, it can be optimized in terms of the simplest circuit design or the greatest possible achievable distance between the first and second subcircuit.

The first subcircuit can comprise a programmable logic device which is set up to communicate with a control computer and/or to convert an action requested in a standard protocol into a call for one or more elementary functions. Further, the first subcircuit comprises a non-volatile memory in which a fixed configuration of the programmable logic device is stored. The use of programmable logic devices, in particular field-programmable gate arrays (FPGA), has the advantage that an optimal implementation can be provided for the particular protocol, and parallel processing is also possible. The programmable logic device only has to be configured once by the manufacturer of the adapter for the desired protocol. The first subcircuit can be designed configurable to a limited extent; in particular, it can be provided to make a selection between multiple stored configurations when initializing the programmable logic device. Therefore, the first subcircuit can then be preconfigured with multiple fixed variants.

A fixed configuration also does not rule out that individual parameters or flags can be set to make detailed adjustments and, for example, to switch subfunctions on or off. The configuration of the programmable logic device can also have activatable special functions in the various versions, such as in particular a unit for processing lists with measurement requirements. Lists with DAQ measurement requests submitted in accordance with the XCP protocol (the abbreviation DAQ stands for Data Acquisition) can then be converted into a corresponding large number of calls for a single-value reading functionality if the individual interface of the embedded system itself does not offer any option for handling lists. Here, the special functions are expediently implemented permanently in the configuration and only need to be activated when the adapter is initialized.

The second subcircuit can be implemented separately from the first subcircuit, wherein the second subcircuit comprises a stand-alone programmable logic device and/or a microcontroller and a memory, containing a logic configuration and/or program instructions, so as to provide at least one elementary function out of the overall set of elementary functions. The memory can be non-volatile, or in each case when the adapter is initialized, the logic configuration can be transferred via the internal interface, for example, if the first subcircuit has a sufficiently large non-volatile memory. This enables a flexible choice of the device used on the second subcircuit, it being possible to flexibly weigh the required computing power and space and energy requirements against one another.

The adapter can comprise at least two circuit boards, between which at least one conductor is arranged, in particular a flexible conductor and/or a pin header, wherein the first subcircuit is implemented on the first board and the second subcircuit on the second board. The flexible conductor can be made in particular as a cable or stranded wire or as a flexible board area. The spatial separation of the subcircuits made possible thereby has particular advantages if the installation space near the control unit is limited and/or the power supply is difficult and/or unfavorable ambient conditions prevail. Then, for example, only the second subcircuit must be functional in a broader operating range or have a particularly reliably sealed housing.

The adapter can have a further individual interface, for example, a sensor interface and/or a drive circuit for an actuator, and/or that the adapter has a bus interface, in particular for an automotive bus such as CAN, CAN FD, or LIN. The control circuit for an actuator can supply purely logical control signals or can also comprise power electronics, disposed on the second subcircuit, for operating the actuator. If the adapter has a bus interface, a large number of devices can be addressed, so that a gateway function can also be implemented.

The adapter can comprise an additional interface, via which a further computer can be connected, wherein the at least one provided elementary function can be activated by means of a call via the additional interface. Further, the adapter comprises an arbitration unit, which is designed to forward a call from the first interface or from the additional interface to the programmable computing module for execution. In the simplest case, the arbitration unit can be realized like a switch with or without a preferred position; preferred position here means that incoming calls via a first interface are always executed preferentially. In this case, the standard interface or the additional interface can be preferred as the first interface. The protocol of the additional interface can correspond hereby to the protocol of the standard interface or deviate from it. In principle, it can thus be intended to provide a conversion into one or more elementary functions for a defined selection of additional interfaces. The effort for creating conversion rules is only necessary once for each protocol of the additional interface. Because only elementary functions are called out of the overall set of elementary functions, the support of a further protocol or a further additional interface does not require any changes to the functional part of the second subcircuit. It can be provided to dispose the additional interface on the first or second subcircuit.

The arbitration unit can comprise at least one buffer and can be designed to successively execute multiple temporally overlapping incoming calls for functionalities base on at least one predefined rule.

In particular, the predefined rule can provide that the existence of a condition is checked in order to define the desired prioritization on the basis of this criterion. For example, a specification of time slots for the individual interfaces can take place such that for a first predefined period of time the standard interface can send calls cyclically and the additional interface is blocked, or for a second time period the additional interface can send calls and the standard interface is blocked. In an alternative embodiment, it can be provided, for example, that calls for functionalities received via the standard interface always have a higher or lower priority than calls for functionalities received via the additional interface. Accordingly, this can also be seen as a prioritization on the basis of the respective computer, because there is a fixed 1:1 association between the interface and the computer. Alternatively or in addition, it can also be provided to select the priority on the basis of the called functionality. The arbitration unit is preferably implemented on the second subcircuit.

The standard interface can be assigned a first buffer, and the additional interface is assigned a second buffer, wherein a call for a functionality is stored in the buffer associated with the interface through which the call for the functionality is received. For the case that both buffers contain at least one call, the call for a functionality is executed first to which a higher priority has been assigned. If the priority is assigned based on the interface via which a call for a functionality is received, it can also be provided alternatively to assign a buffer only to the lower-priority interface.

The arbitration unit can have a buffer for multiple function calls, wherein the calls stored in the buffer are executed successively according to their position, and wherein new incoming calls are sorted into the buffer by their priority so that calls with a high priority are executed before calls with a low priority. The buffer can in particular be designed as a FIFO memory (First in First Out).

The invention further relates to a computer system comprising an embedded system, a control computer, and an adapter of the invention, wherein the embedded system is connected to the control computer via the adapter, and wherein preferably the first subcircuit of the adapter is integrated into the control computer.

Further, according to the invention, a method for adapting an adapter is provided, in particular an adapter of the invention, wherein the adapter has a standard interface, a first subcircuit, and a second subcircuit, the first subcircuit being designed to communicate with a control computer via the standard interface, in particular according to a standard such as Ethernet or IOCNET, by means of a standard protocol, in particular XCP, wherein the first subcircuit is designed further to convert a protocol functionality requested in the standard protocol via the standard interface, out of a set of supported protocol functionalities into the call for one or more elementary functions out of a defined overall set of elementary functions, wherein the first subcircuit is connected to a second subcircuit via an internal interface, wherein the second subcircuit has a user-selectable or adaptable individual interface, wherein the second subcircuit comprises a programmable logic device and/or a microcontroller, and wherein the second subcircuit implements at least one elementary function out of the defined overall set of elementary functions, wherein the implementation of the at least one elementary functions is created by the user on the basis of a library comprising a plurality of parameterizable elementary functions, wherein at least one parameter of the at least one elementary function is selected individually by the user and/or at least one action of the elementary function is added by the user. The term parameter is to comprise any user-specified information that specifies a functionality more precisely. Thus, a parameter can be a numeric value, a memory address, or a string constant. A binary sequence or a machine instruction of a processor of the embedded system can also fall under the term parameter. It can also be provided that the specification of an action sequence can be carried out by means of an individual selection of a parameter (which in particular also contains an enumeration of the actions to be executed). The at least one action of the elementary function can be a logical or arithmetic operation or a processor instruction of the programmable computing module. Because the implementation of the provided elementary functions is carried out individually by the user, any adaptations to the specific application are possible.

The term library can also comprise the case of a predefined file, for example, a VHDL file, which defines an internal interface. In principle, a file with a netlist could also be used. Expediently, at least one provided elementary function supplies a result dependent on the connected hardware, such as the embedded system or a sensor. If elementary functions of the overall set of elementary functions are not provided in the specific application, the predefined file can thus define the return of a fixed zero value or error value.

The library can be designed as a block library in a technical computing environment that can simulate dynamic systems using block diagrams, wherein the block library comprises one or more elementary functions in one or more implementations, and wherein the executable binary code for the programmable logic device and/or microcontroller of the second subcircuit is generated automatically at least partially from a block diagram. For example, a fundamentally similar functionality can be offered in different variants or different functional scopes. By creating the executable binary code from a block diagram using a code generator, a functionality that has been tested once can be used on all hardware platforms supported by the code generator.

The block library can offer two different implementations of the same or comparable functionality, wherein the type of implementation can be selected by the user in a graphical user interface. Expediently, the first implementation occurs with the help of a microprocessor, and the second implementation is designed as a logic circuit in the configuration of a programmable logic device. A microprocessor can expediently also be implemented as an IP core on a programmable logic device or an FPGA, and the block library can comprise software components adapted to the specific IP core.

The first subcircuit can be designed as a fixed configuration of a programmable logic device, and the library can contain a definition of the internal interface in a hardware description language, in particular VHDL or Verilog, wherein the second subcircuit can be implemented at least partially on a programmable logic device based on the definition.

The library can comprise a minimal implementation for each of the elementary functions out of the overall set of defined elementary functions, wherein preferably the minimum implementation does not have any parameters individually adaptable by the user, and wherein for each elementary function not individually implemented by the user, the minimal implementation is provided on the second subcircuit. Thus, the implementation effort of the user for the respective application is minimized.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
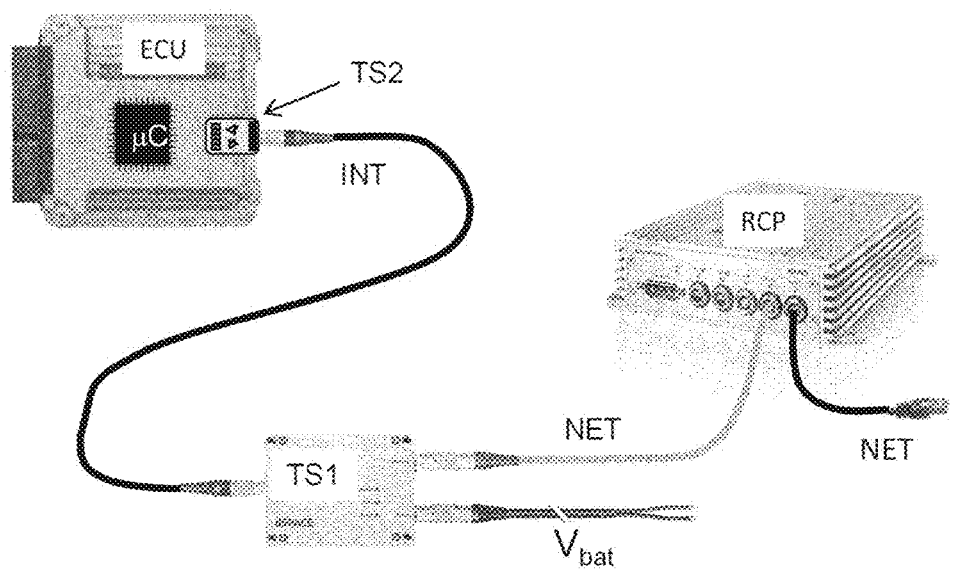
FIG. 1 shows an exemplary embodiment of an adapter.

The illustration in FIG. 1 shows a computer system with an exemplary embodiment of an adapter of the invention.

A control computer RCP is connected via a standard interface NET to a first subcircuit TS1 of the adapter. The standard interface NET can be designed as a network interface according to the Ethernet standard, but a standard such as PCI Express or a variant of a standard, for example, IOCNET, can also be used. In addition, the first subcircuit has a socket for connecting a supply voltage $V_{bat}$. Alternatively, it can also be provided that power is supplied to the adapter via the standard interface NET to reduce the number of required lines. The first subcircuit TS1 is designed to receive measurement requests and/or control commands of the control computer RCP via a standard protocol such as XCP and to convert these into calls of predefined functionalities.

The first subcircuit TS1 is connected to a second subcircuit TS2 via an internal interface INT. This has a range of functions defined by the user and can thus be adapted specifically to the particular application and in particular to the microcontroller µC to be connected. By providing only required functionalities, the second subcircuit TS2 can be implemented to be energy-saving and compact, so that it can be expediently placed directly adjacent to an embedded system such as the control unit ECU and thus can be supplied with power via the internal interface INT or a connection of the control unit ECU. In particular, the individual interface can be designed such that the second subcircuit TS2 can be plugged directly onto the control unit ECU and is thus connected not only electrically but also mechanically thereto, wherein it is expediently protected against environmental influences and implemented such that a reliable function is ensured over a wide temperature range.

In the example shown, the control computer RCP can be connected to a user PC, such as a notebook, via a further standard interface NET.

Figure 2:
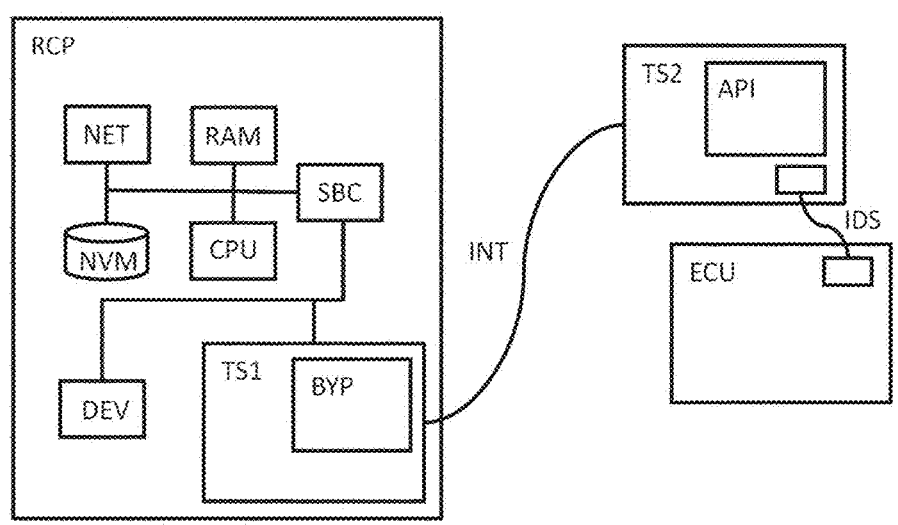
FIG. 2 shows an exemplary embodiment of an adapter.

In the illustration in FIG. 2, an exemplary embodiment of an adapter of the invention is shown, in which the adapter is integrated at least partially into a control computer.

The control computer RCP has at least one processor CPU, in particular a multi-core processor or multiple processors, a working memory RAM, and a non-volatile memory NVM, on which preferably an operating system and/or a bootloader are stored. A first subcircuit TS1 of the adapter and a device interface DEV are connected via a high-speed bus SBC or an appropriate controller. Expediently, a plurality of modules (not shown) can be connected via the device interface DEV, such as, for example, interface cards which provide one or more analog or digital I/O channels. The first subcircuit TS1 expediently comprises a programmable logic device, in particular an FPGA. The programmable logic device comprises at least one (sub-) configuration BYP that is designed to receive measurement requests in a standard protocol such as XCP and to convert them into calls for defined functionalities.

The first subcircuit TS1 is connected via an internal interface INT to a second subcircuit TS2, which is expediently adapted, with respect to its individual interface IDS and the implemented functionalities, to the properties of the control unit ECU under test and the planned measurements. The individual interface IDS can have a specially designed socket, an individual plug, or a pin header. It can also be provided that (as indicated graphically) the second subcircuit TS2 is connected via a cable to the control unit ECU.

Figure 3:
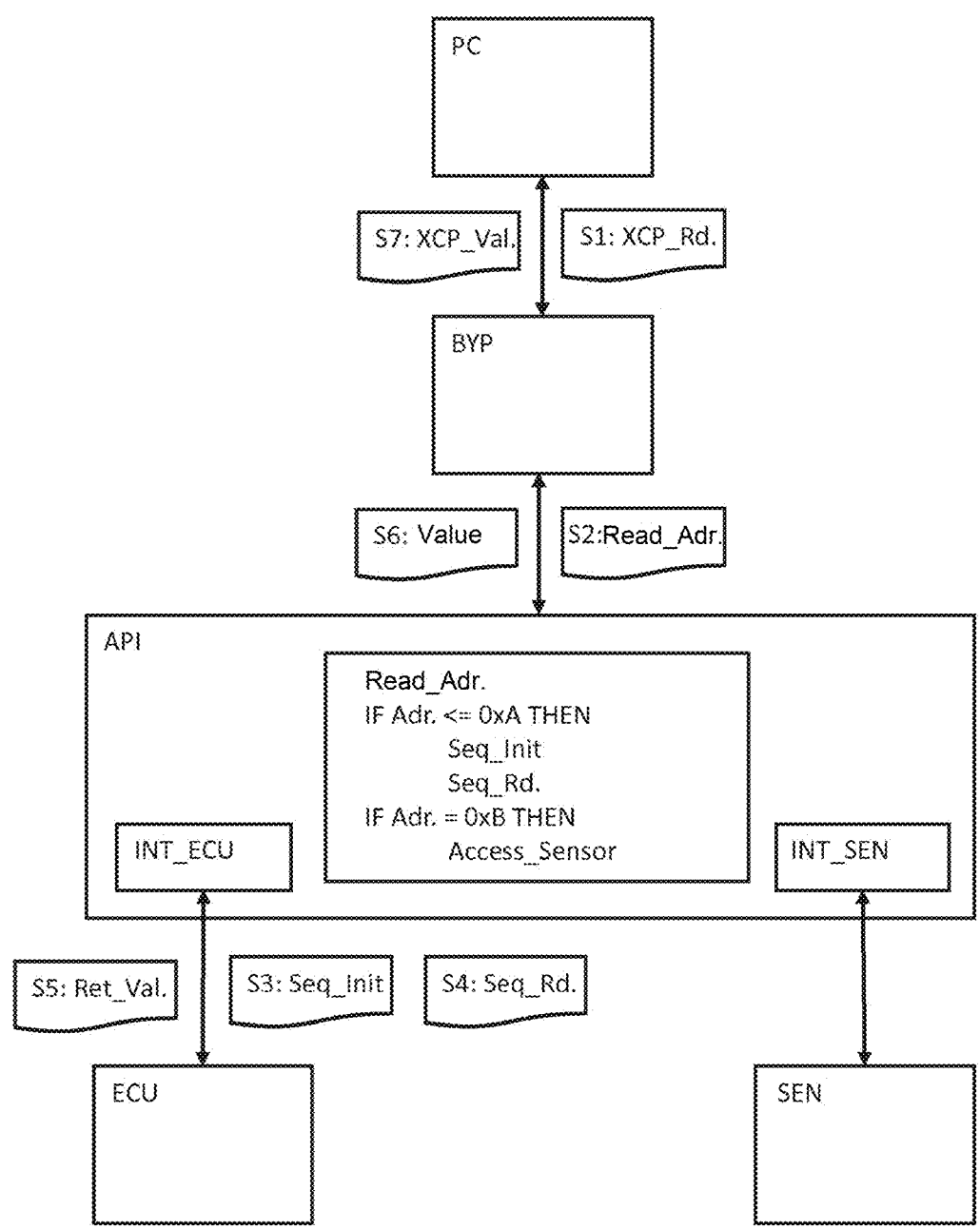
FIG. 3 shows a schematic view of a data exchange with an adapter.

The illustration in FIG. 3 shows an example of a data exchange with an adapter according to the invention, wherein only the units involved in the communication and exchanged data or messages are shown schematically.

A control computer PC sends XCP messages to a first function block BYP, which converts them into calls for defined functionalities and sends them to a second function block API. A function block can be designed, in particular, as a complete configuration or as a sub-configuration of a programmable logic device. The second function block API comprises an individual interface INT_ECU to a control unit ECU and a further individual interface INT_SEN, to which a sensor SEN is connected.

The second function block API is thus adapted to the control unit ECU and the sensor SEN and implements a selection of defined functionalities. Illustrated by way of example is a functionality Read_Adr. which depending on the transferred address enables reading of the control unit ECU or the sensor SEN.

If, for example, a value is to be read out of the control unit ECU, then the control computer in step S1 sends an appropriate command according to the XCP standard, which is indicated here by XCP_Rd. The first function block BYP receives the command and converts it in step S2 into a call for the defined functionality Read_Adr., which is sent to the second function block API. In this example, this function block converts the call in that if the function Read_Adr. is called in a first address range, for addresses up to 0xA, a first signal Seq_Init is sent in a step S3 and a second signal Seq_Rd. is sent to the control unit ECU in a further step S4 via the individual interface INT_ECU.

In particular, the signals can correspond to individual processor instructions, whether regular program instructions or debug interface commands, of a microprocessor of the ECU, whereupon it reads out the desired address and the control unit ECU in step S5 transfers a corresponding return value Ret Val. to the second function block API. This function block can extract the value and convert it to the appropriate binary format before the return value Value is transferred to the first function block BYP in step S6. In step S7, the BYP function generates the corresponding XCP message XCP_Val. and sends it to the control computer PC.

In the example shown, it can also be provided that the second function block API, therefore, in particular the second FPGA configuration, returns a current output value of the connected sensor SEN when the address 0xB is read. It can be provided further that the second function block API is designed to read out a current sensor signal at regular time intervals via the further individual interface INT_SEN and to check it for the fulfillment of a predefined condition. If the condition is met, an XCP message can be reported to the control computer PC, for example, via the first function block BYP, therefore, in particular the first FPGA configuration, or a command sequence stored in the first function block BYP, for example, for processing an address list, can be executed. In principle, therefore, based on the defined functionalities, complex behavior patterns can also be easily realized.

In particular, the defined functionalities can comprise one or more of the below following functionalities:

Reading a value wherein the address that is read from can be selected as a parameter. For example, a value of a variable can be read at the specified memory address; it can also be a converted input variable of an analog-to-digital converter, which is connected via a memory-mapped interface. Different sensors can be easily read out with such a simple read access;

Reading multiple values, wherein the address or the address range and/or the number of successive values can be selected as a parameter. In this case, a list with addresses, an address range defined by a start address and block size, and/or alternatively also an address range specified by a start address and end address can be described. Such a block read access could be designed so that the overhead for the internal protocol is low;

Writing a value wherein the address that is written to can be selected as a parameter. In addition to adjusting the values of parameters stored in the control unit memory, hereby, for example, a voltage can also be output via a digital-to-analog converter, which is connected via a memory-mapped interface;

Writing multiple values, wherein the address range or the start address and the number of values to be written can be selected as parameters. Alternatively or in addition to a block write access, a sequence write access could also be provided in which, for example, another value is written to the same address at predetermined time intervals. Using a digital-to-analog converter, a function generator for outputting any waveforms can therefore be provided with little effort;

Monitoring an address, wherein an address to be monitored can be selected as a parameter, and wherein an event is reported and/or a value at the address is read if the value at the address has changed. The reporting of the event can already contain the specification of the value if, for example, the individual interface comprises a trace interface based on the Nexus standard. Deviating bit assignments can be taken into account by means of a parameterization of the individual interface implemented on the second subcircuit;

Monitoring an address range, wherein multiple addresses to be monitored can be selected as parameters, in particular by specifying a start address and an end address. If the individual interface comprises the functionality of a trace interface, a plurality of changed values can thus be easily detected. It can be provided in this case that reporting of individual values is implemented in the internal interface, and that the first subcircuit is designed to combine a plurality of these values into a list, which is transferred in accordance with the XCP protocol. It can also be provided that the second subcircuit comprises a unit for handling lists;

Reporting a predefined value in the case of a call for a predetermined address, wherein the value that is to be reported and the address can be selected as parameters. Such a functionality enables different applications: Thus, a value could be "faked" if, for example, a query requires a certain result, but a different value is stored at the appropriate memory address in the control unit. As a result, for example, a matching version number could be reported to a software tool. Alternatively or in addition, it can also be provided that values reported by the control unit are temporarily stored and are only then transferred to the control computer when an appropriate read request is received on the standard interface. In another application, the program flow of a processor or microcontroller of the control unit could be monitored, and a report is issued when a particular program address is executed. In this case, the call for the address would come from the control unit. It can also be provided to monitor an address in the memory and in each case to output a report when the microcontroller of the control unit accesses this address in order to read or write a value.

Reporting a predefined event, wherein the event can be selected as a parameter. The second subcircuit could thus be designed to generate an event at predefined time intervals. Alternatively or in addition, it can also be provided to monitor an address in the control unit, and to report a change in the value as an event and/or to determine the changed value and to report it to the control computer; and/or Managing the status of the at least one individual interface, in particular an initialization and/or a reading out of the current status of the individual interface.

This makes it possible to read out a status of the control unit, for example, to detect a fault condition. Provision can also be made to actively trigger a status change, for example, a reset of the control unit. If the individual interface of the control unit requires an initialization, for example, a bit sequence to be sent can be transferred as a parameter.

Figure 4:
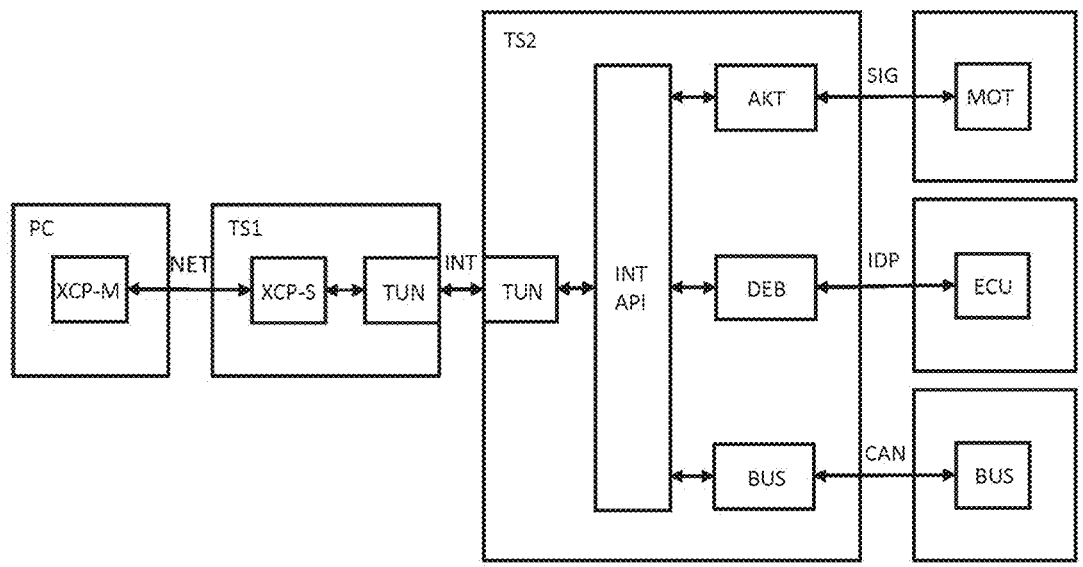
FIG. 4 shows an exemplary embodiment of an adapter.

In the illustration of FIG. 4, a third exemplary embodiment of an adapter of the invention is shown, in which multiple external devices are connected to the adapter via different interfaces.

The adapter comprises a first subcircuit TS1 and a second subcircuit TS2, which can be arranged spatially separated from one another and are connected via an internal interface INT. The first subcircuit TS1 is connected to a control computer PC via a standard interface NET, wherein the communication in the example shown takes place by means of the XCP protocol. The control computer is designed to send commands as an XCP master XCP-M to an XCP slave XCP-S disposed on the first subcircuit TS1. The XCP slave XCP-S for implementing a standard protocol is part of the first function block BYP, not shown in this illustration.

The specified internal interface INT can be tunneled hereby via various physical interfaces TUN, in particular serial interfaces such as LVDS (low-voltage differential signals), so that a high transmission speed is possible despite a small number of connection lines. The underlying physical interface TUN is present on both the first and second subcircuit. It can be at least partially integrated into the first function block BYP and/or into the second function block API; however, for example, driver modules for signal amplification or a filter for received signals can also be disposed on the respective subcircuit.

The second subcircuit TS2 comprises multiple individually configured interfaces via which various external devices are connected. The provided functions are implemented in the second function block API. This comprises a first sub-block INT_API, which in the example shown is connected to an actuator interface AKT, a bus interface BUS, and a debugging interface DEB. The actuator interface AKT can be configured as a digital interface for the clean output of control signals; the second subcircuit TS2, however, can also comprise additional components, which enable an analog control and power supply of an actuator, for example, an electric motor MOT. The debugging interface DEB can largely be designed according to a standard protocol such as Nexus, but can have a different bit assignment or changed functions, depending on the connected control unit ECU or its microcontroller or more generally its programmable computing module. The bus interface BUS can implement, for example, the CAN, CAN FD, or LIN standard, so that a large number of different control units can be connected.

In principle, it can also be provided that the first subcircuit TS1 and the second subcircuit TS2 are arranged spatially closely adjacent and are connected not only electrically but also mechanically, in particular via a pin header. Then preferably both subcircuits can be enclosed by a common housing.

Figure 5:
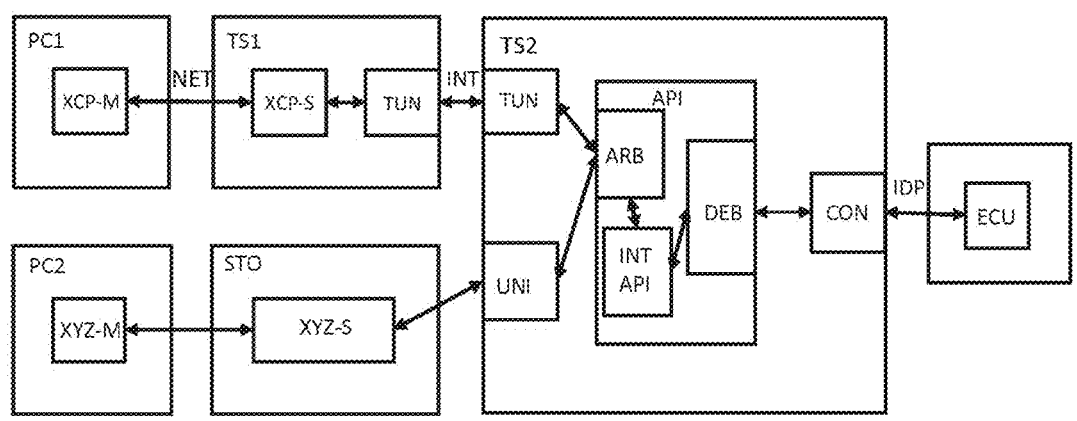
FIG. 5 shows an exemplary embodiment of an adapter.

The illustration in FIG. 5 shows a fourth exemplary embodiment of a sensor of the invention, which has an additional interface for connecting to a further control computer.

A first control computer PC1 comprises an XCP master XCP-M which is connected via a standard interface NET to an XCP slave XCP-S disposed on the first subcircuit TS1. The XCP slave XCP-S is part of a first function block BYP (not shown otherwise), which is connected to the second subcircuit TS2 via an underlying physical interface TUN and an internal interface INT.

A second function block API, which comprises an arbitration unit ARB, a generic function part INT_API, and a debugging interface DEB, is disposed on the second subcircuit TS2. In principle, a large number of further individual interfaces could be connected to the generic function part INT_API; in the present case only the debugging interface DEB is shown for the sake of simplicity. In addition to the second functional block API, which is preferably implemented on a programmable logic device, the second subcircuit TS2 can have additional circuit parts which perform, for example, a signal conversion. In the present example, an additional circuit CON is shown, which comprises, for example, a special connector. The debugging interface DEB is connected to the control unit ECU by means of the additional circuit CON via an individual protocol IDP.

Further, a second control computer PC2 is shown, which is configured to send instructions via an access unit XYZ-M to an additional adapter STO with an access receiver XYZ-S. The additional adapter STO is designed to convert the received access protocol commands into calls for predefined functionalities, as implemented on the second function block API. An additional interface is used to connect to the second subcircuit, which comprises an additional interface block UNI. The additional interface block UNI is adapted to the additional adapter STO and designed to forward incoming calls for functionalities to the arbitration unit ARB.

The arbitration unit ARB can be realized in various ways and in particular can prioritize according to different rules. Thus, for example, calls that are received via the standard interface can always be preferred to the calls received via the additional interface. It can also be provided, however, that prioritization occurs according to the called functionality, or that each control computer is assigned a cyclic time slot, in which only calls of this control computer are forwarded or processed. Buffering of incoming calls can also be provided in the arbitration unit ARB. Alternatively, it could also be provided that the interface blocks, which are disposed on the second subcircuit and which are assigned to the physical interface TUN or the additional interface UNI, each have a buffer.

Figure 6:
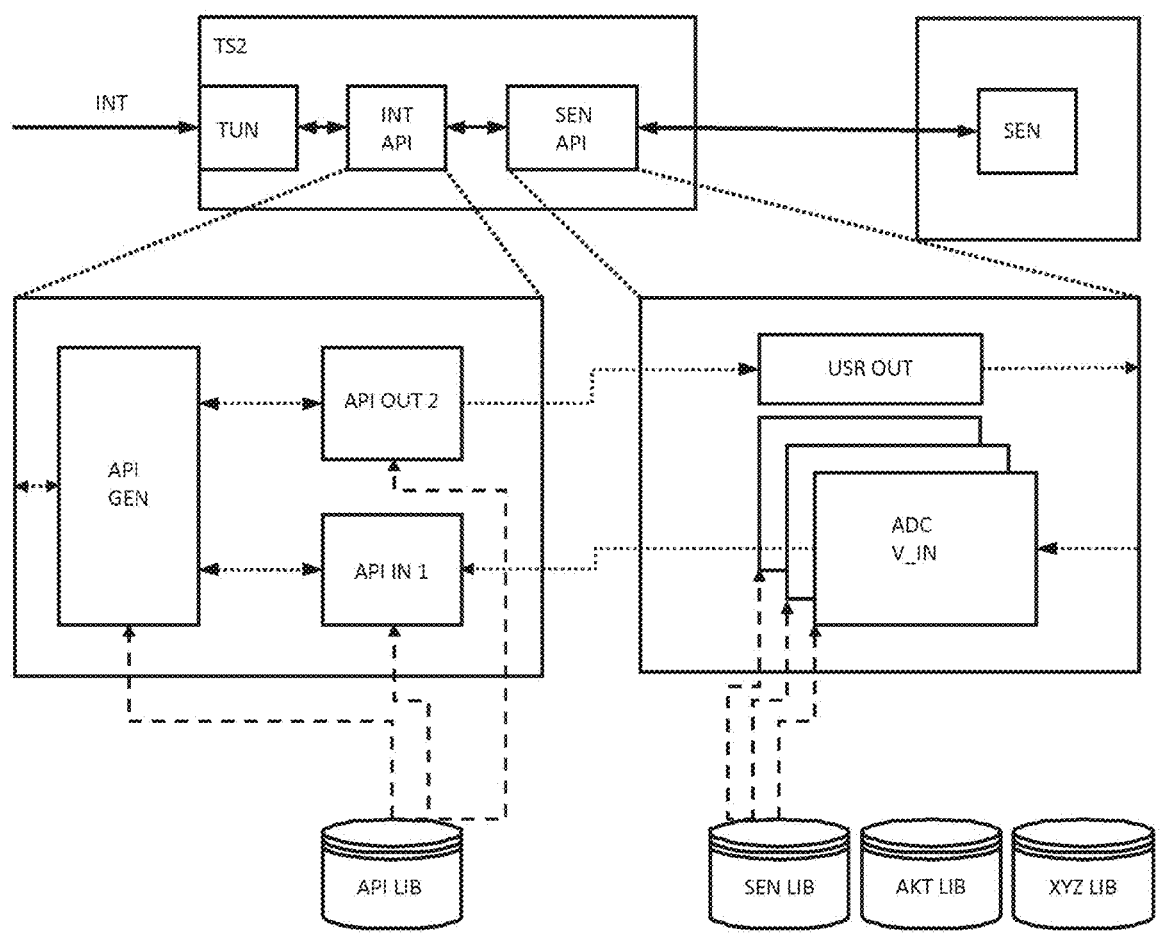
FIG. 6 is a schematic representation of the configuration of an adapter with the help of libraries.

The illustration in FIG. 6 is a schematic representation of the configuration of an adapter of the invention, wherein the defined functionalities of the second subcircuit TS2 are at least partially implemented by means of libraries. The first subcircuit, which expediently need not be configured, is not shown.

The second subcircuit TS2 receives calls for predefined functionalities via the internal interface INT and the underlying physical interface TUN. In the example shown, the functionalities provided on the second subcircuit are implemented with the help of a first subblock INT_API and a second subblock SEN_API. The subblocks are additionally shown in a detail view in the illustration and are preferably realized as subconfigurations on an FPGA. The detail view shows a data exchange with dotted arrows.

The first subblock INT_API comprises the general part of the interface and is expediently implemented on the basis of a first library API_LIB. This can also be a block library of a technical computing environment, by means of which a model of the desired functionality is created. A code generator or build environment can then convert the model into an executable binary code. The executable binary code can be designed both as program instructions of a microprocessor and as a configuration of a programmable logic device. In principle, it is also possible to distribute the functionality to a microcontroller and to a programmable logic device, if both are present. The first library API_LIB can comprise a large number of templates for predefined functionalities, which can be adapted on the basis of user-defined parameters. If the template or the master for a specific function block was taken from a library, this is shown in the detail view by dashed arrows.

In the present case, the first subblock INT_API comprises a generic interface block API_GEN, which in particular receives the calls for the various functionalities and activates the corresponding function blocks. In this case, the activated function block can also depend on call details, e.g., the desired address of a read access. In addition, the generic interface block API_GEN can also contain buffers for incoming calls and/or outgoing data. Reading a value at an address can be implemented using a read function block API_IN_1, which contains the logic for reading without any level conversion. Writing a value to an address can be done using a generic write function block API_OUT_2 that contains the logic for writing without any level conversion.

The address that is read from can be transferred or be permanently configured in the function block API_IN_1. As a result, the user can choose whether a read function block API_IN_1 is to be used for all read accesses, in particular for reading various individual interfaces, or whether a read function block API_IN_x (x=1 . . . n) is to be used for each address to which a read access is to be possible in principle. Any intermediate levels are possible in principle. By using a plurality of read function blocks, parallel processing is possible when using a programmable logic device, so that a tradeoff between speed and area or logic cell requirements can be made. Accordingly, this also applies to write or other functional blocks. It is expedient if the configuration of the individual addresses is automated by evaluating a description file of the controller to be connected, which contains a list of addresses and the assigned values. This can be a A2L file known per se or an XML file with addresses and associated input-output functions.

The second subblock SEN_API comprises the various individual interfaces of the adapter, wherein in the example shown only one sensor SEN is connected. Expediently, a large number of templates or masters for specific individual interfaces are provided in libraries, in particular in the form of a sensor connection library SEN_LIB, an actuator connection library AKT_LIB library, or in general a library XYZ_LIB for one or more different types of individual interfaces. Values can be output to the sensor SEN via a function block USR_OUT, wherein a level conversion or other required signal conversions are performed. A further function block ADC_V_IN is used to read the output voltage of the sensor and to convert it into a digital value. In principle, a large number of the respective function blocks can be used, as indicated by the stored blocks.

Because an adapter of the invention is clearly structured into subcircuits and preferably into function blocks, large parts of the functionalities can be acquired from libraries, so that the user has only a small adaptation effort. Furthermore, the first, fully configured subcircuit offers the implementation of a standard protocol, so that a large number of standard software applications can be used for communication on the control computer.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adapter for connecting an embedded system to a control computer, the adapter comprising:
    a standard interface;
    a first subcircuit; and
    a second subcircuit, the first subcircuit being configured to communicate with the control computer via the standard interface via a standard protocol,
    wherein the first subcircuit is connected to a second subcircuit via an internal interface,
    wherein the second subcircuit has a programmable computing module which is configured to provide at least one elementary function out of an overall set of elementary functions which can be called up via the internal interface via a call,
    wherein the first subcircuit is designed to convert one or more values received via the internal interface into a protocol format of the standard protocol,
    wherein the second subcircuit is connectable to the embedded system via an individual interface,
    wherein the first subcircuit comprises a programmable logic device and a non-volatile memory in which a fixed configuration of the programmable logic device is stored,
    wherein the first subcircuit converts a protocol functionality requested in the standard protocol via the standard interface out of a set of supported protocol functionalities into the call for one or more elementary functions out of a defined overall set of elementary functions, and
    wherein the second subcircuit comprises a user-writable memory in which a binary code of the programmable computing module is stored.

2. The adapter according to claim 1,
wherein the second subcircuit is implemented separately from the first subcircuit,
wherein the second subcircuit comprises a stand-alone programmable logic device and/or a microcontroller as the programmable computing module, and
wherein the user-writable memory contains a logic configuration and/or program instructions to provide the at least one elementary function out of the overall set of elementary functions.

3. The adapter according to claim 2,
wherein the adapter comprises at least two circuits boards including a first circuit board and a second circuit board, between which at least one conductor is arranged including a flexible conductor and/or a pin header,
wherein the first subcircuit is implemented on the first circuit board and the second subcircuit on the second circuit board.

4. The adapter according to claim 1,
wherein a component population of the first subcircuit remains fixed, and
wherein the second subcircuit has at least one electrical connection that enables an adaptation of one or more components disposed on the second subcircuit.

5. The adapter according to claim 1,
wherein the adapter has a further individual interface or a sensor interface and/or a drive circuit for an actuator, and/or
wherein the adapter has a bus interface.

6. The adapter according to claim 1,
wherein the adapter comprises an additional interface via which a further computer is connectable,
wherein the at least one provided elementary function is activated via a call via the additional interface, and
wherein the adapter further comprises an arbitration unit, which is designed to forward a call from the first interface or from the additional interface to the programmable computing module for execution.

7. The adapter according to claim 6, wherein the arbitration unit further comprises at least one buffer and is designed to successively execute multiple temporally overlapping incoming calls for functionalities based on at least one predefined rule.

8. The adapter according to claim 7,
wherein either the first interface is assigned a first buffer and the second interface is assigned a second buffer, wherein a call for a functionality is stored in the buffer associated with the interface through which the call for the functionality is received, wherein for the case that both buffers contain at least one call, the call for a functionality is executed first to which a higher priority has been assigned, or
wherein the arbitration unit has a buffer for multiple function calls, wherein the calls stored in the buffer are executed successively according to their position, and wherein new incoming calls are sorted into the buffer by their priority so that calls with a high priority are executed before calls with a low priority.

9. The adapter according to claim 1, wherein the defined functionalities comprise one or more of the following functionalities:
reading a value wherein the address that is read from can be selected as a parameter;
reading multiple values, wherein the address range or the address list can be selected as a parameter;
writing a value wherein the address that is written to can be selected as a parameter;
writing multiple values, wherein the address range or the address list can be selected as a parameter;
monitoring an address, wherein an address to be monitored can be selected as a parameter, and wherein an event is reported and/or a value at the address is read if the value at the address has changed;
monitoring an address range, wherein multiple addresses to be monitored can be selected as parameters, in particular by specifying a start address and an end address;
reporting a predefined value in the case of a call for a predetermined address, wherein the value that is to be reported and the address can be selected as parameters;
reporting a predefined event, wherein the event can be selected as a parameter; and/or
managing the status of the at least one individual interface, an initialization, and/or a reading out of the current status of the individual interface.

10. A computer system comprising an embedded system, a control computer, and an adapter according to claim 1,
wherein the embedded system is connected to the control computer via the adapter, and
wherein the first subcircuit of the adapter is integrated into the control computer.

11. A method for adapting an adapter, wherein the adapter has a standard interface, a first subcircuit, and a second subcircuit, the first subcircuit being designed to communicate with a control computer via the standard interface via a standard protocol, wherein the first subcircuit is connected to the second subcircuit via an internal interface, wherein the second subcircuit has a user-selectable or adaptable individual interface, wherein the second subcircuit comprises a programmable logic device and/or a microcontroller, the first subcircuit comprising a programmable logic device and a non-volatile memory in which a fixed configuration of the programmable logic device is stored, the method comprising:
converting, via the first subcircuit, a protocol functionality requested in the standard protocol via the standard interface out of a set of supported protocol functionalities into the call for one or more elementary functions out of a defined overall set of elementary functions;
implementing, via the second subcircuit at least one elementary function out of the defined overall set of elementary functions, the implementation of the at least one elementary function being created by a user on the basis of a library comprising a plurality of parameterizable elementary functions; and
selecting at least one parameter of the at least one elementary function individually by the user and/or adding at least one action of the elementary function by the user.

12. The method according to claim 11,
wherein the library is designed as a block library in a technical computing environment that can simulate dynamic systems using block diagrams,
wherein the block library comprises one or more elementary functions in one or more implementations, and
wherein an executable binary code for the programmable logic device and/or microcontroller of the second subcircuit is generated automatically at least partially from a block diagram using a code generator.

13. The method according to claim 12,
wherein the block library offers two different implementations of the same or comparable functionality, wherein a type of implementation can be selected by the user in a graphical user interface of the technical computing environment, wherein a first implementation of the two different implementations occurs with the help of a microprocessor, and wherein a second implementation of the two different implementations occurs as a logic circuit in the configuration of a programmable logic device.

14. The method according to claim 11, wherein the first subcircuit is designed as a fixed configuration of a programmable logic device, wherein the library contains a definition of the internal interface in a hardware description language, and wherein the second subcircuit is at least partially implemented based on the definition on a programmable logic device.

15. The method according to claim 11, wherein the library comprises a minimal implementation for each of the elementary functions out of the overall set of defined elementary functions, wherein the minimum implementation does not have any parameters individually adaptable by the user, and wherein, for each elementary function not individually implemented by the user, the minimal implementation is provided on the second subcircuit.

16. The adapter according to claim 1, wherein the adapter facilitates that at least one elementary function is adaptable by a user.

17. The adapter according to claim 1, wherein the elementary function includes a logical or arithmetic operation or a processor instruction of the programmable computing module.

18. The adapter according to claim 1, wherein the standard protocol is a universal measurement and calibration protocol XCP.

19. The method according to claim 11, wherein the standard protocol is a universal measurement and calibration protocol XCP.

* * * * *